US006844952B2

(12) United States Patent
Dalziel

(10) Patent No.: US 6,844,952 B2
(45) Date of Patent: Jan. 18, 2005

(54) ACTUATOR-CONTROLLED MIRROR WITH Z-STOP MECHANISM

(75) Inventor: Warren Dalziel, Monte Sereno, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 405 days.

(21) Appl. No.: 09/956,609

(22) Filed: Sep. 18, 2001

(65) Prior Publication Data

US 2003/0053232 A1 Mar. 20, 2003

(51) Int. Cl.[7] .................. G02B 26/00; G02B 7/182; G01V 8/00; G01D 5/30; H01J 3/14
(52) U.S. Cl. .................. 359/224; 359/840; 359/872; 250/559.29; 250/230; 250/234
(58) Field of Search .................. 359/223, 224, 359/225, 226, 872, 876, 840; 250/559.29, 230, 234

(56) References Cited

U.S. PATENT DOCUMENTS

| | | | | |
|---|---|---|---|---|
| 3,071,036 A | | 1/1963 | McKnight et al. | |
| 4,317,611 A | * | 3/1982 | Petersen | |
| 5,239,361 A | | 8/1993 | Burch | |
| 5,535,047 A | * | 7/1996 | Hornbeck | |
| 5,579,148 A | * | 11/1996 | Nishikawa et al. | |
| 5,637,861 A | * | 6/1997 | Okada et al. | |
| 5,648,618 A | * | 7/1997 | Neukermans et al. | |
| 5,969,465 A | * | 10/1999 | Neukermans et al. | |
| 6,086,209 A | * | 7/2000 | Miyahara et al. | |
| 6,147,790 A | * | 11/2000 | Meier et al. | |
| 6,188,502 B1 | | 2/2001 | Aoki | |
| 6,230,976 B1 | | 5/2001 | Sauter et al. | |
| 6,245,590 B1 | * | 6/2001 | Wine et al. | |
| 6,259,548 B1 | * | 7/2001 | Tsugai et al. | |
| 6,262,827 B1 | | 7/2001 | Ueda et al. | |
| 6,454,421 B2 | * | 9/2002 | Yu et al. | |
| 6,552,840 B2 | * | 4/2003 | Knipe | |
| 6,556,333 B2 | * | 4/2003 | Tokuda et al. | |

FOREIGN PATENT DOCUMENTS

| | | |
|---|---|---|
| EP | 0977066 | 2/2000 |
| JP | 05119280 | 5/1993 |
| JP | 08220455 | 8/1996 |
| JP | 08334722 | 12/1996 |

* cited by examiner

Primary Examiner—Ricky D. Shafer
(74) Attorney, Agent, or Firm—Fish & Richardson P.C.

(57) ABSTRACT

Actuator-controlled mirrors with a Z-stop mechanism to reduce an undesired translational motion of the mirrors.

10 Claims, 8 Drawing Sheets

ACTUATOR-CONTROLLED MIRROR WITH Z-STOP MECHANISM

BACKGROUND

This application relates to operations and designs of devices that include a mirror engaged to a rotation actuator to rotate around one or more rotational axes.

A rotation actuator may be engaged to a mirror to control the orientation or rotation of that mirror. Various rotation actuators may be used for this purpose, including but not limited to, galvanometers, piezo-electric actuators, and MEMS actuators fabricated on semiconductor substrates. Such a rotation actuator generally includes a mechanism that produces a force or torque to move the mirror when energy applied thereto is turned on or changed.

A typical galvanometer, for example, has an electromagnetic assembly in which a coil carrying an electric current is placed inside a magnetic field to rotate around a rotational axis. The electromagnetic interaction between the magnetic field and the current produces a torque to cause the rotation of the coil. Springs may be movably engaged to and hence suspend the coil to a fixed frame to rotate around one or two axes. In one example where the magnetic field is a static field, the direction and magnitude of the current in the coil may be controlled to control the rotational motion of the coil. The coil rotation under the torque can deform the springs to cause a counter-acting mechanical torque generated by the torsion of the springs. When the current is set at a particular magnitude in a selected direction, the coil can be set at a stationary state at a respective rotational angle when the torque on the coil is equal to the counter-acting torque on the coil. The current can be adjusted to change the torque on the coil and hence the orientation of the coil.

SUMMARY

One embodiment of the device of the present application includes a fixed frame, a mirror assembly, a support member, a rigid support bar fixed to the fixed frame, and a pivot support unit. The mirror assembly includes a mirror that reflects an optical beam to produce a reflected optical beam. The support member is coupled between the fixed frame and the mirror assembly to rotatably engage the mirror assembly to rotate around at least one rotational axis relative to the fixed frame. The pivot support unit is disposed between and in contact with the support bar and the mirror assembly to pivot the mirror assembly with respect to the support bar. The pivoting reduces a translational motion of the mirror assembly along a direction substantially perpendicular to the rotational axis.

DETAILED DESCRIPTION

Figure 1:
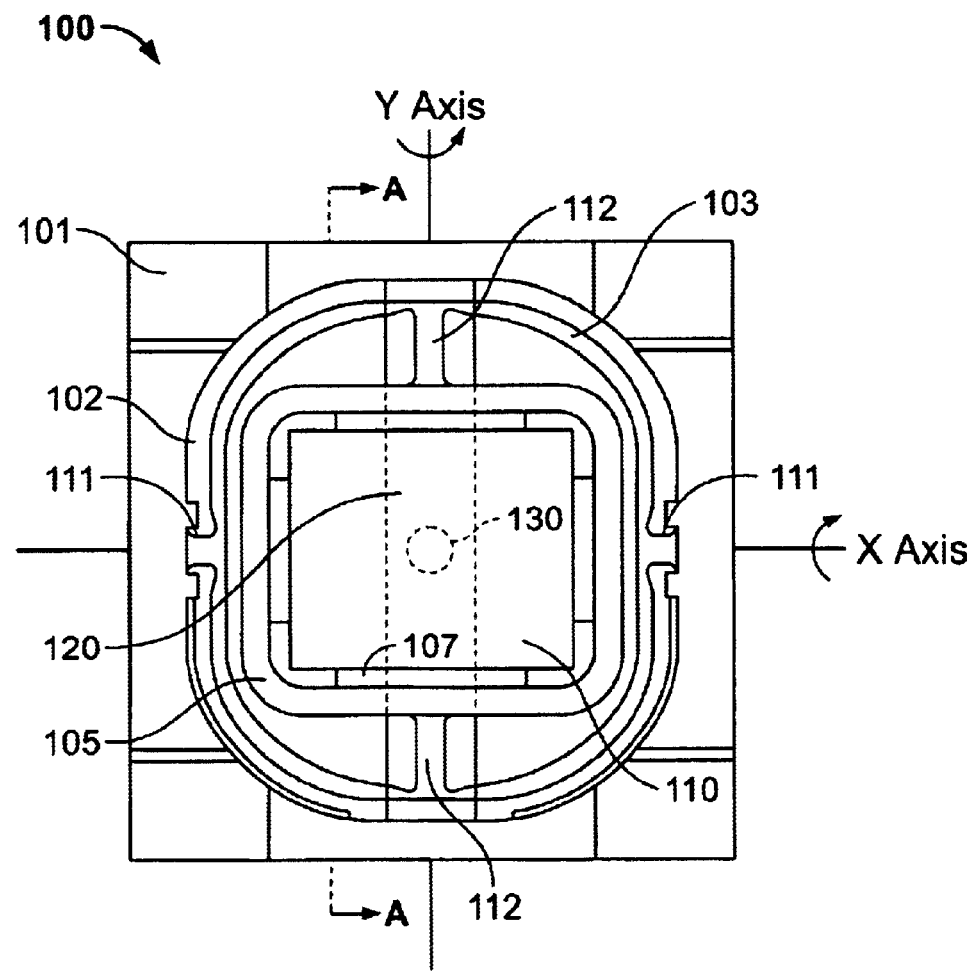
FIG. 1 illustrates one embodiment of a device having a mirror engaged to a two-dimensional rotation actuator and a Z-stop mechanism, where a two-axis galvanometer is implemented as the actuator.

This application describes devices with actuator-controlled mirrors that has a Z-stop mechanism to prevent a mirror from moving along a direction Z which is substantially perpendicular to a rotational axis of the mirror. According to one embodiment, the Z-stop mechanism provides a pivot point at or near the center of rotation of the mirror assembly that includes one or two mirror and other components fixed relative to one another. Hence, the mirror assembly is pivoted to essentially eliminate any translational motion along the Z direction and to provide an accurate control of the rotational motion and position of the mirror under action of the rotation actuator.

This Z-stop mechanism may be implemented in a variety of actuator-controlled mirrors. Typical actuator-controlled mirrors have a support member to support the mirror, or the mirror assembly to which the mirror is fixed, to at least one rotational axis. Such a support member may be, e.g., two pivot points along the rotational axis to hold the mirror or the mirror assembly. When the mirror or the mirror assembly is designed to rotate under the action of the rotation actuator around two rotational axes which are substantially perpendicular to each other in many cases, two sets of the above two pivot points are used to support the mirror or the mirror assembly to respectively define the two rotational axes. In both the single-axis rotation and two-axis rotation designs, the actuator may be coupled to the mirror or the mirror assembly to cause a rotation of the mirror around the rotational axis either in a scanning mode where the mirror changes its orientation constantly to scan the direction of a reflected optical beam, or in a static mode where the mirror is controlled at a particular orientation at one time but may be adjusted to another orientation at a different time. In either of the operating modes, any translational movement of the mirror along the Z direction perpendicular to the one or two rotational axes is substantially reduced or essentially eliminated by the pivoting of the Z-stop mechanism.

The rotation actuators in devices with actuator-controlled mirrors and the Z-stop mechanism may be implemented in various forms. Examples include, but are not limited to, galvanometers, piezo-electric actuators, and micro actuators used in micro-electro-mechanical systems (MEMS) fabricated on semiconductor substrates. The following description will use exemplary devices based on two-axis galvanometers to illustrate implementations of the Z-stop mechanism. Therefore, the specific aspects of galvanometers should not be understood as limitations of the techniques and applications of the Z-stop mechanism.

The actuator-controlled mirrors shown in the following examples use a gimbal-type flexure spring as the aforementioned support member to hold a mirror assembly in a galvanometer design to rotate around one or two rotational axes. The geometric and mechanical designs of the flexure spring define the rotational axis or axes. The mirror assembly includes at least one mirror for directing light, one or two electric coils as part of the galvanometer actuator, and an inner frame for engaging and fixing the mirror to the coil or coils. These different components of the mirror assembly are fixed relative to one another and hence move or rotate with the electric coil or coils of the galvanometer as a single rigid body. The orientation of the coil or coils of the galvanometer, hence, determines the rotational position of the mirror.

The galvanometer includes one or two magnetic units, e.g., magnets, to produce one or two magnetic fields to cause the electromagnetic force in each coil and the torque for rotating the coil and the mirror assembly. The direction of a magnetic field for causing rotation along a particular rotational axis may be substantially perpendicular to the rotational axis for efficient interaction between the current in the coil and the magnetic field. Hence, a two-axis galvanometer has two coils that carry two independent electric currents for causing and controlling rotations around the two axes. Such single-axis or two-axis galvanometer mirrors, or actuator-controlled mirrors in general, have applications in various optical devices and systems for changing a direction of a beam in a controlled manner, e.g., optical switching, beam scanning, and beam routing.

In certain applications, it may be desirable to confine the motion of the mirror assembly or the mirror to the rotation around the single rotational axis or two orthogonal rotational axes (e.g., X and Y) without movement in any other direction. This condition allows the reflected direction of an input beam to be accurately controlled. However, this desirable condition is often compromised by practical limitations of the support member that holds the mirror assembly to the single or two rotational axes.

One particular limitation, for example, is that the support member is not perfectly rigid and may deform under a force in the Z direction which is perpendicular to the single or two rotational axes. This deformation may cause a translational shift of the mirror and hence lead an undesired shift in the position or reflected beam path of a reflected beam.

The flexure spring in the following examples is used as the support member to confine the motion of the assembly of the mirror and the coil to the rotation around the single or two rotational axes. The flexure spring may be designed to have a small torsional stiffness to allow for easy rotation around the X and Y directions and the stiffness of the flexure spring may be desired to be large for any other directions to eliminate any motion other than the rotation of the mirror as practically feasible. However, the flexure spring tends to react to a force along a direction different from its rotational axis and hence to deform under this force. This deformation can cause a lateral translational movement perpendicular to the rotational axis. This lateral translational movement is undesirable in various applications because it can adversely affect the positioning accuracy of the reflected beam. This undesired effect may occur, for example, when the galvanometer mirror assembly is oriented in a position that the rotational axis is not parallel to the direction of the gravity and hence the gravitational force on the mirror causes the flexure spring to bend and hence cause a shift in position of the mirror.

One approach to reduce this undesired effect would be to increase the stiffness of the flexure spring in all other directions without increasing the torsional stiffness for the rotation around the rotational axis beyond a desired stiffness limit. In some applications, the upper limit of the stiffness may be about 20 mNmm/rad. The torsional stiffness should be as small as possible to reduce the amount of power needed to operate and control the galvanometer mirror. Low power consumption of the galvanometer mirror may be particularly desirable when multiple galvanometers are used within a device or system such as an optical switching array. In practice, this approach may be technically difficult because the torsional stiffness around the rotational axis will be inevitably increased when the stiffness in other directions increases.

In recognition of the above and other considerations, this application describes a different approach which uses the Z-stop mechanism to substantially confine the movement of the mirror or the mirror assembly to rotation around one or more rotational axes without any significant translational movement. In the Z-stop mechanism, a fixed pivot support bar is provided to add a pivot support to the rotatable mirror or the mirror assembly. The pivot support has a pivot point in contact with the mirror or the mirror assembly at or near the center of rotation defined by the support member (e.g., the flexure spring) to prevent the translational movement along the Z direction. Because the Z-stop mechanism is used to eliminate the translational motion, the stiffness of the support member need not be high. In the example of the flexure spring, its stiffness can be reduced as much as practically feasible to reduce the power of the rotation actuator.

FIG. 1 illustrates one embodiment of a two-dimensional galvanometer mirror 100 which implements the above Z-stop mechanism. A mirror 110, an inner frame 107, and two coils 105 and 106 (only coil 105 is visible) are engaged together and are fixed relative to one another to form the mirror assembly. A flexure spring 103 is used as the support member to engage the mirror assembly to two rotational axes along X and Y directions to a fixed outer frame 101.

In the example as illustrated, the flexure spring 103 is formed of a thin resilient metallic plate (e.g., a metallic alloy such as BeCu) with a thickness of about tens of microns. The metallic plate is patterned to have a first set of thin arms 111 that are engaged to the outer frame to define the X rotational axis, and a second set of thin arms 112 that are engaged to the mirror assembly to define the Y rotational axis. When a proper torque is applied to the mirror assembly, the flexure spring 103 is deformed to rotate the mirror assembly relative to the fixed outer frame 101. Various flexure springs may be used as the flexure spring 103. In this example, the flexure spring 103 is conceptually shown to have a rectangular or square ring structure with the thin arms 111 and 112 as integral parts of the ring structure. The thin arms 111 protrude and extend outside of the ring of the flexure 103 and have their ends engaged to the opposite sides of the outer frame 101. The thin arms 112, integral to another pair of opposing sides of the ring structure of the flexure 103, protrude and extend towards the center of the ring to define the Y rotational axis that is substantially perpendicular to the X axis.

In this embodiment, two coils 105 and 106 are provided and are fixed relative to each other in the mirror assembly to produce two independently-controlled electromagnetic torques that are respectively with respect to the X and Y axes in two substantially orthogonal external magnetic fields. Two sets of magnets may be engaged to the outer frame 101 to produce the magnetic fields. The inner frame 107 may be used as a coupling element between the coils 105, 106 and the mirror 110 to engage the mirror 110 to the coils 105, 106 as a single-body mirror assembly.

As discussed above, it is desirable to design the flexure spring 103 to provide compliance and have a small stiffness about two rotational axes X and Y. Although the pattern of the flexure 103 may be specifically designed to be relatively stiff in the X and Y directions, the low torsional stiffness around the X and Y rotational axes can inherently make the stiffness of the flexure spring 103 in the Z direction sufficiently small so that, upon a force along the Z direction, the flexure spring 103 tends to deform along the Z direction to shift the position of the mirror 110. This may occur, for example, when the galvanometer mirror 100 is oriented to have an angle between the gravity and either of the X and Y axes.

Figure 2A:
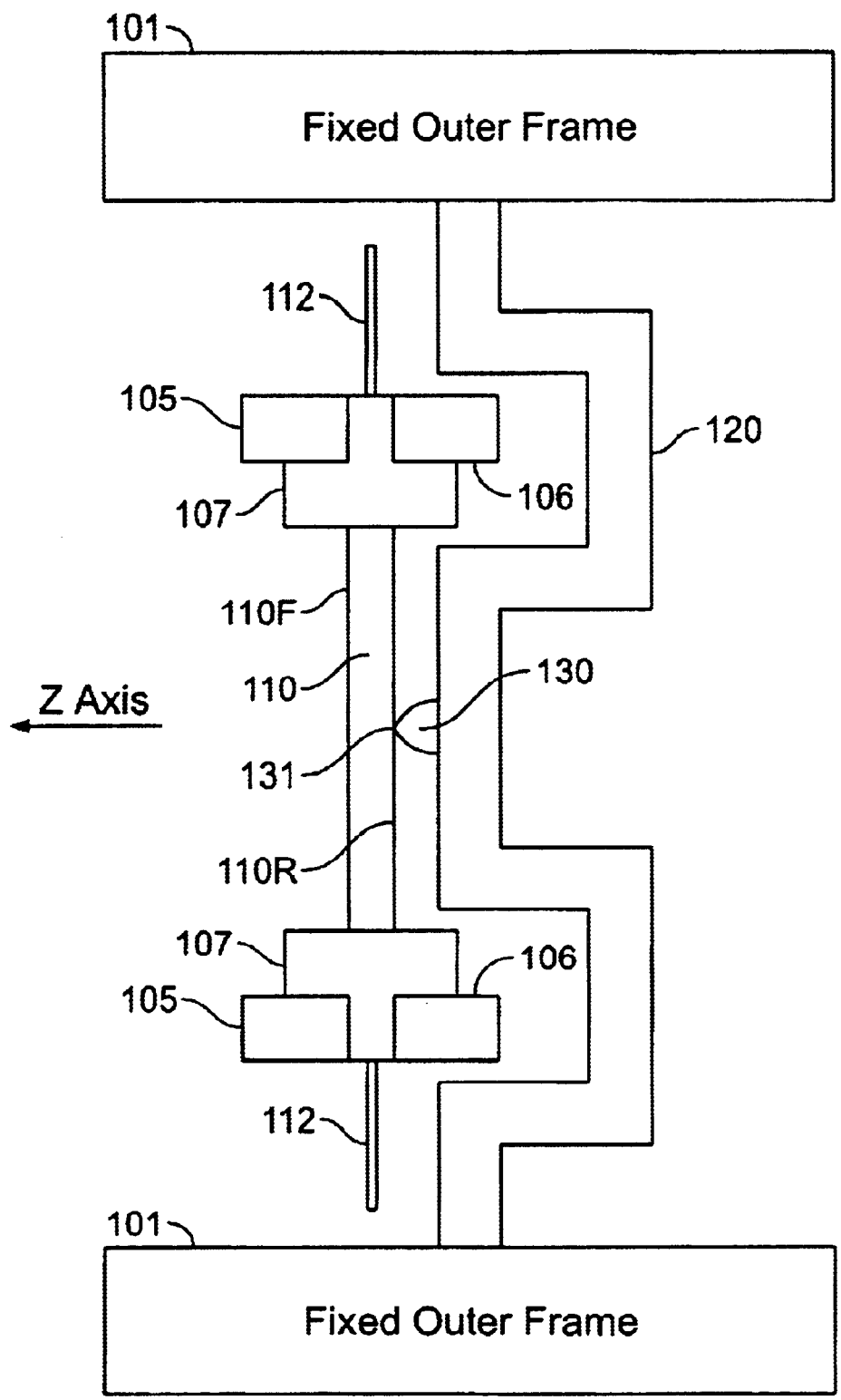
FIG. 2A shows a side view of the device in FIG. 1 along the lines AA to show additional details of the Z-stop mechanism in one exemplary implementation, where the pivot point of the Z-stop mechanism is shown to be on the back surface of the mirror.
Figure 2B:
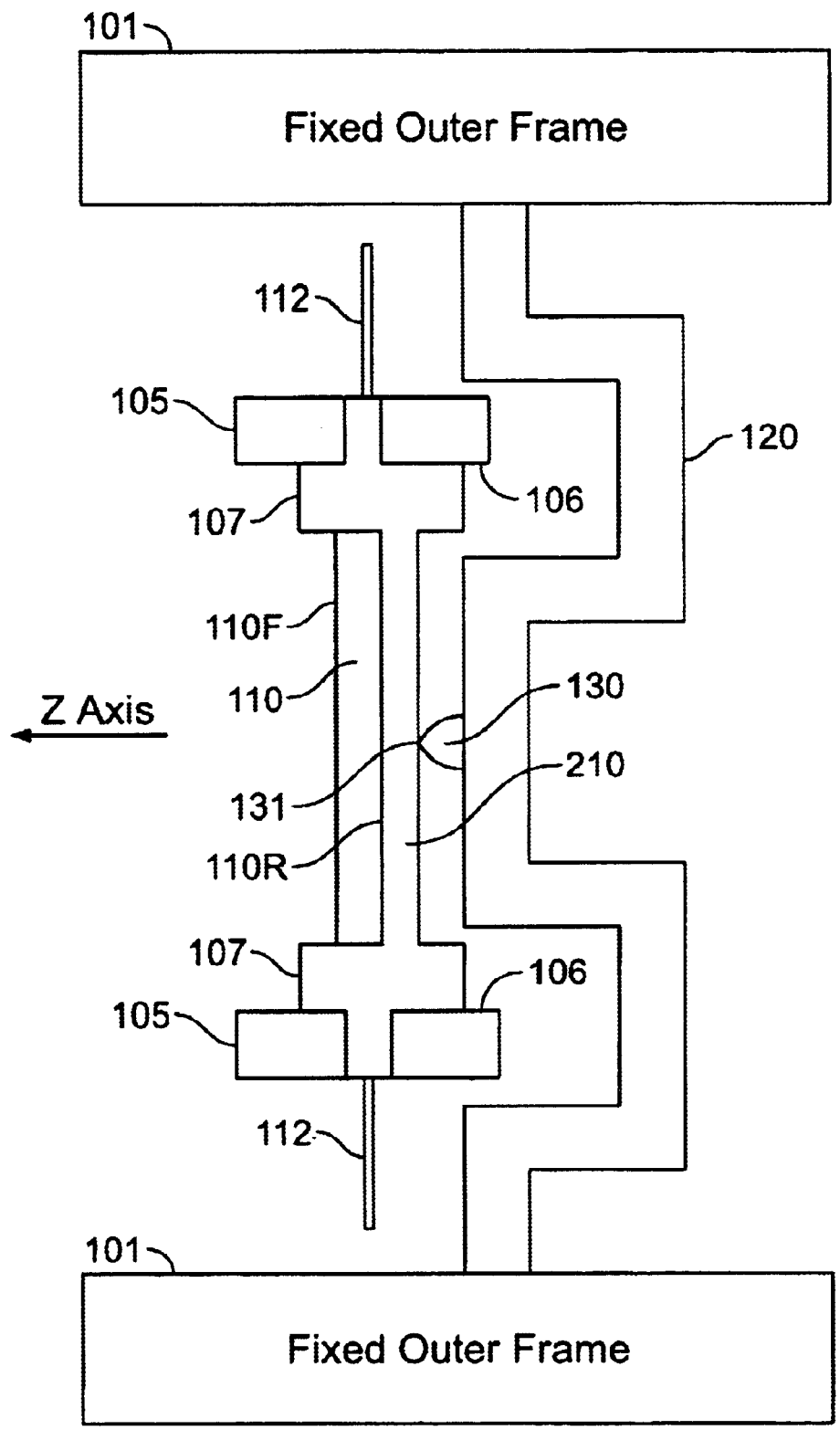
FIG. 2B shows a side view of the device in FIG. 1 along the lines AA to show additional details of the Z-stop mechanism in another exemplary implementation, where the pivot point of the Z-stop mechanism is shown to be at a location on a movable inner frame and away from the back surface of the mirror.

The Z-stop mechanism prevents this shift in the mirror position along the Z direction. In this embodiment, the Z-stop mechanism includes a rigid pivot support bar 120 engaged to and fixed to the outer frame 101 and a pivot support unit 130 to support the mirror assembly by contacting it at or near the center of rotation of the mirror assembly. FIGS. 2A and 2B show details of the Z-stop mechanism in two exemplary implementations by side views of the device 100 in FIG. 1 along the line AA. The mirror 110 is the only mirror in the mirror assembly and has a front reflective surface 110F and a rear support surface 110R. The second coil 106 is also shown to be engaged to the inner frame 107. A beam is guided to the front reflective surface 110F and is redirected by the mirror 110 via optical reflection.

In FIG. 2A, the mirror assembly is designed to have its center of rotation near the rear support surface 110R. The pivot support bar 120 is shown to have a bended portion positioned close to the rear support surface 110R. The pivot support unit 130 is fixed to the bended portion of the bar 120 and has a tip which provides a pivot point 131 to contact and support the mirror 110 on the rear support surface 110R of the mirror 110. This pivot point 131 is usually at or near the intersection of the X and Y rotational axes. Since the support bar 120 is rigid and fixed to the frame 101, the mirror 110 pivots at the pivot point 131 with respect to the bar 120 and hence the frame 101 when rotating around either or both of the X and Y axes. Under this configuration, any lateral movement of mirror 110 along the Z direction can be substantially reduced to a negligible level.

The mirror assembly may also be designed to place the center of rotation away from the rear surface 110R of the mirror 110. FIG. 2B shows one example where the inner frame 107 has an extended portion 210 on which the center of rotation of the mirror assembly is located. Hence, the tip of the pivot support unit 130 is in contact with the extended portion 210 of the inner frame 107 to form the pivot point 131. Alternatively, as shown in FIG. 4B, the center of rotation of the mirror assembly may be on or near the surface of the pivot support bar 120. Hence, the pivot support unit 130 may be fixed to the rear support surface 110 to place its tip on the pivot support bar 120 as the pivot point 131.

The Z-stop mechanism maintains the mirror 110 in contact with the fixed pivot support bar 120 and to be pivoted at the pivot point 131 relative to the bar 120 at all times during the operation so that motion along the Z direction is practically eliminated. As a result, the stiffness of the flexure spring 103 is not required to increase to reduce the Z motion and hence may be designed to produce sensitive and accurate rotational movements around the X and Y axes. The torsional stiffness on the flexure spring 103 can be designed at low values(<20 mNmm/rad) to reduce the power for rotating the mirror assembly.

The mirror 110 may be formed from a substrate, such as Si or other semiconductor substrate, a metal substrate, or a glass substrate. The front surface 110F is polished or coated to be optically reflective for reflecting light of a selected wavelength or within a spectral band. The pivot support unit 130 may be formed from various materials with a tip as the pivot point 131. For example, a small dot of silicone gel may be used as the pivot support unit 130. Another variation is to use a small dot of an elastic material such as a silicone gel or an elastic polymer material such as an elastomer to bond the mirror 110 to the pivot support bar 120 where the elastic silicone acts as a multi-directional hinge to reduce the Z movement and to provide damping to the rotation.

The above Z-stop mechanism for two-dimensional actuator-controlled mirror illustrated in FIGS. 1–2B may also be applicable in one-dimensional galvanometer mirror. A single coil 105 can be directly engaged to the fixed frame 101 through the flexure spring 103 by the first set of two thin arms 111 without the second sets of thin arms 112. The coil 105 and the mirror 110 may be rigidly engaged to the flexure 103 to move as one rigid body. Accordingly, only one set of magnets are needed to produce the external magnetic field for rotation around the X axis.

An actuator-controlled mirror with either one rotational axis or two rotational axes may also be designed to have two opposing reflective surfaces that are parallel to each other and face opposite directions. Because the two reflective surfaces rotate together, one surface may be used as a reference to monitor and measure the rotational position of the opposite surface. To implement the above Z-stop mechanism in such a two-sided actuator-controlled mirror, two single-sided mirrors may be engaged to each other to form a mirror assembly with a gap. The mirror assembly may be designed to have its center of rotation located in the gap or on one of the rear surfaces. A portion of the fixed pivot support bar 120 may be bent or shaped to have a portion located in the gap between the mirrors to contact and support one of the two mirrors.

Figure 3:
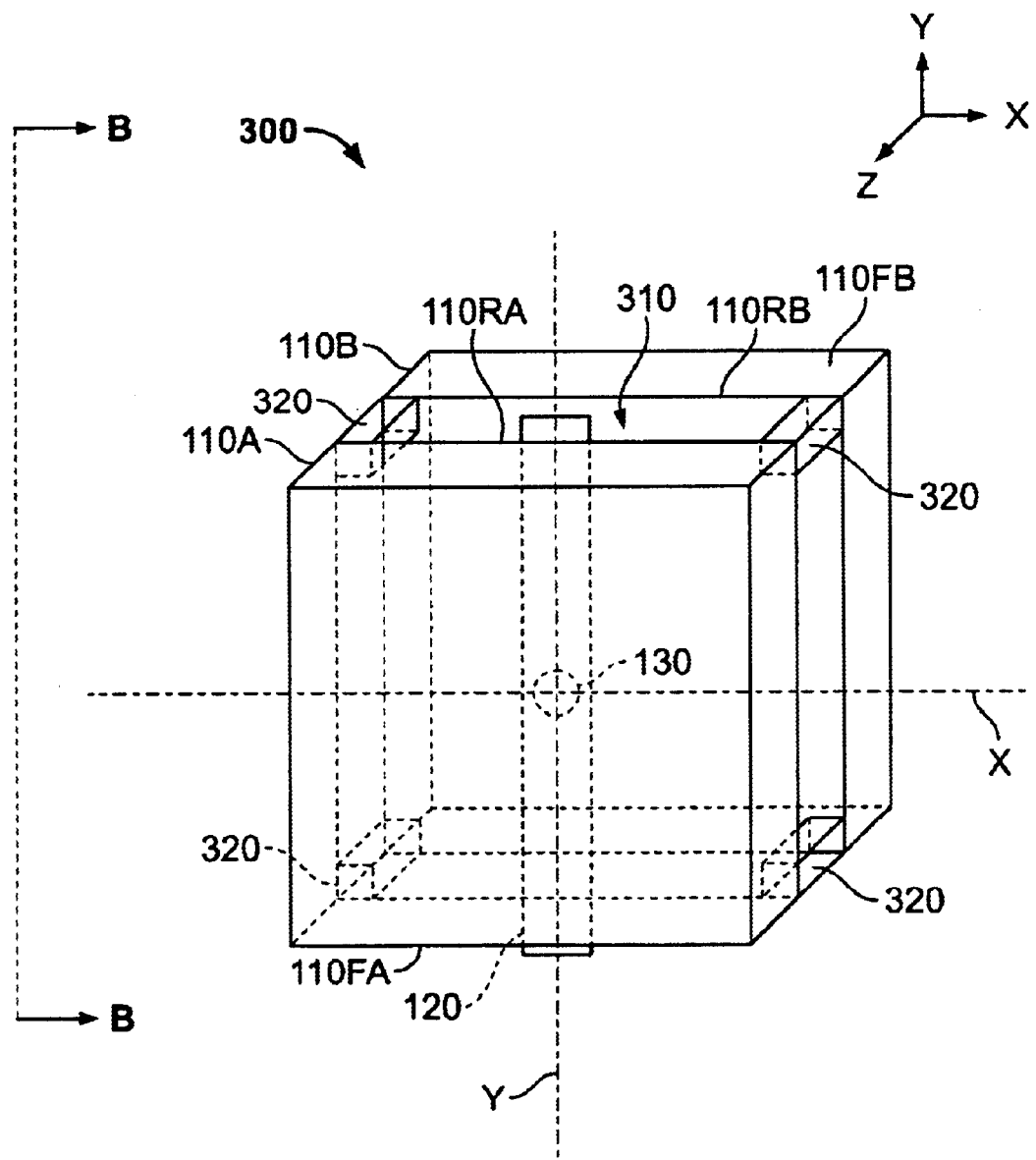
FIG. 3 shows a portion of a device based on the Z-stop mechanism shown in FIGS. 1, 2A and 2B that has two mirrors fixed to each other and controlled by the rotation actuator, where only the two mirrors, the pivot support and the pivot support bar are illustrated.

FIG. 3 illustrates one embodiment 300 of such a two-sided mirror assembly for the actuator-controlled mirror with the Z-stop mechanism. Two one-sided mirrors 110A and 110B are provided. Each mirror has a front reflective surface 110FA or 110FB and a rear support surface 110RA or 110RB. The mirrors 110A and 110B are engaged to each other by having their rear support surfaces 110RA and 110RB face each other in parallel with a gap 310 therebetween. At least two spacers 320 are placed between the surfaces 110RA and 110RB to engage the mirrors 110A and 110B together and to form the gap 310. In actual implementation, the spacers 320 may be part of the inner frame 107 that engages the mirrors 110A and 110B to the coils 105 and 106.

Figure 4A:
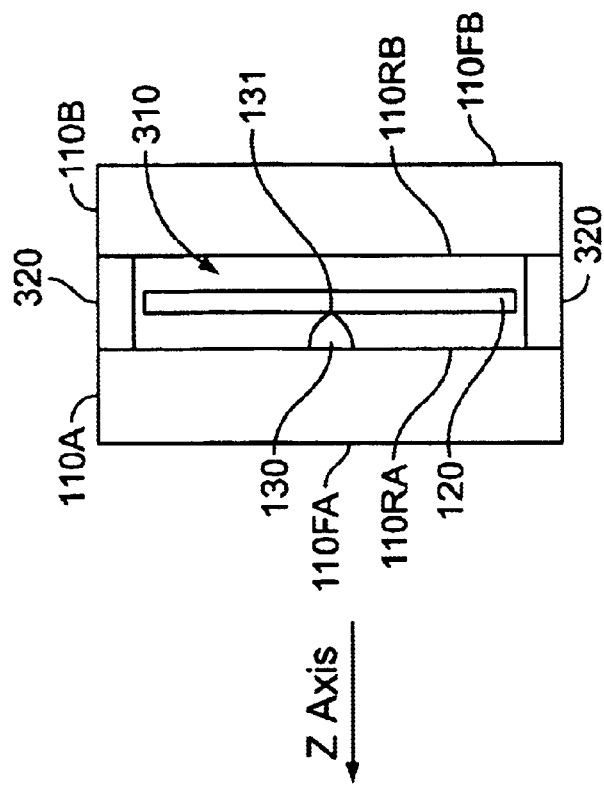
FIG. 4A shows a side view of a portion of the device in FIG. 3 along the line BB to show the pivot point of the Z-stop mechanism on the back surface of the one of the two mirrors according to one embodiment.
Figure 4B:
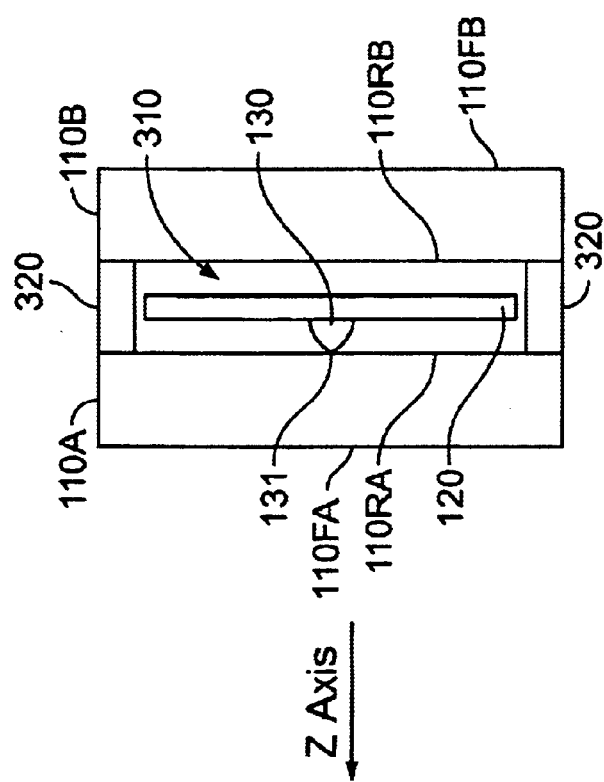
FIG. 4B shows a side view of a portion of the device in FIG. 3 along the line BB to show the pivot point of the Z-stop mechanism on a surface of the pivot support bar which is away from a surface of either of the two mirrors according to another embodiment.

FIG. 4A shows a side view of a portion of the device 300 along the line BB shown in FIG. 3 according to one embodiment where the center of rotation of the mirror assembly with mirrors 110A and 110B is designed to be on the rear surface 110RA of the mirror 110A. Similar to the design shown in FIG. 2A, the pivot support unit 130 is fixed to the pivot support bar 120 to place the tip 131 of the pivot support unit 130 to the rear surface 110RA of the mirror 110A. FIG. 4B shows a side view of a portion of the device 300 along the line BB shown in FIG. 3 according to another embodiment where the center of rotation of the mirror assembly with mirrors 110A and 110B is designed to be off the rear surface 110RA of the mirror 110A and located in the gap 310. One surface of the pivot support bar 120 may be positioned at or near the center of rotation so that the pivot support unit 130 can be fixed to rear surface 110RA of the mirror 110A to place the tip 131 on the surface of the pivot support bar 120. Alternatively, similar to the design in FIG. 2B, the inner frame 107 may have an extended portion in the gap 310 so that the pivot support unit 130 can be fixed to the bar 120 to place its tip 131 on the extended portion of the inner frame 107.

Figure 5A:
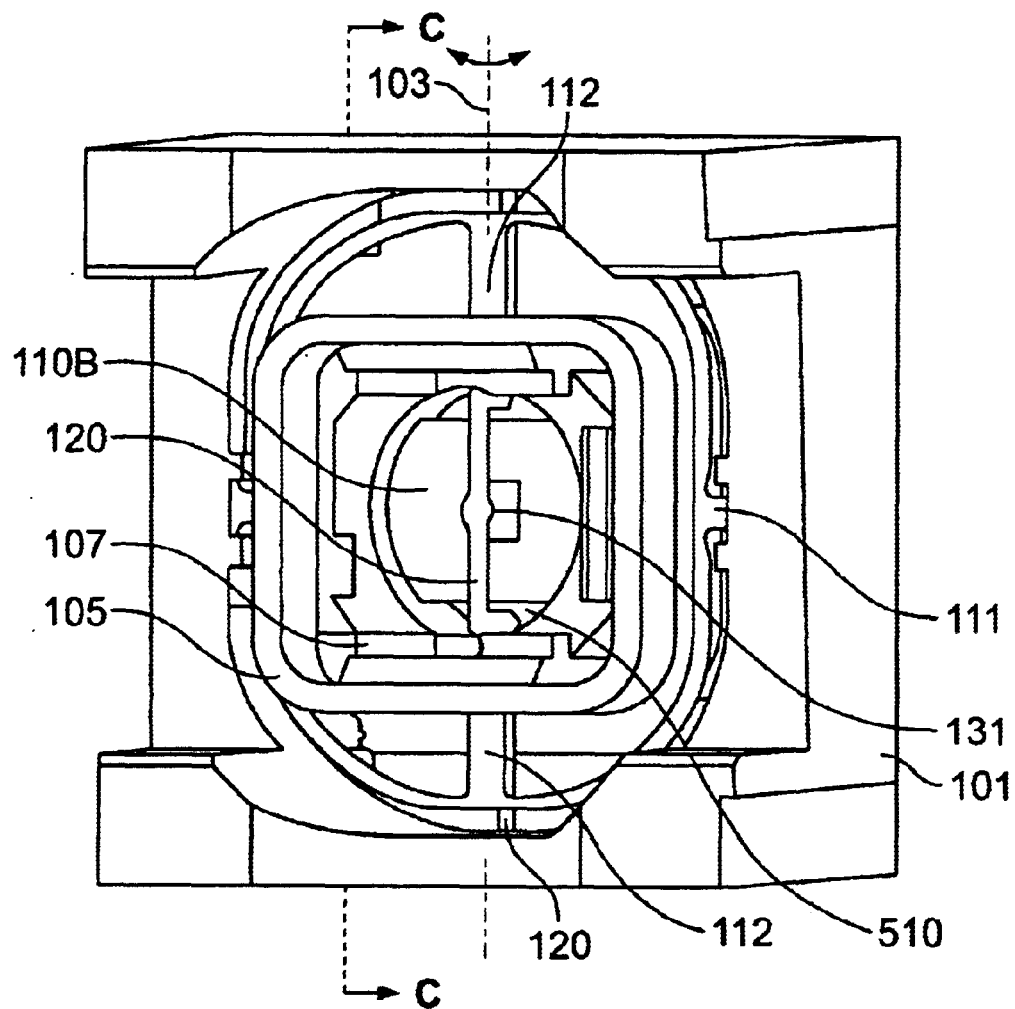
FIGS. 5A and 5B show additional details of the Z-stop mechanism in a two-mirror device with a galvanometer as the rotation actuator in one exemplary implementation.
Figure 5B:
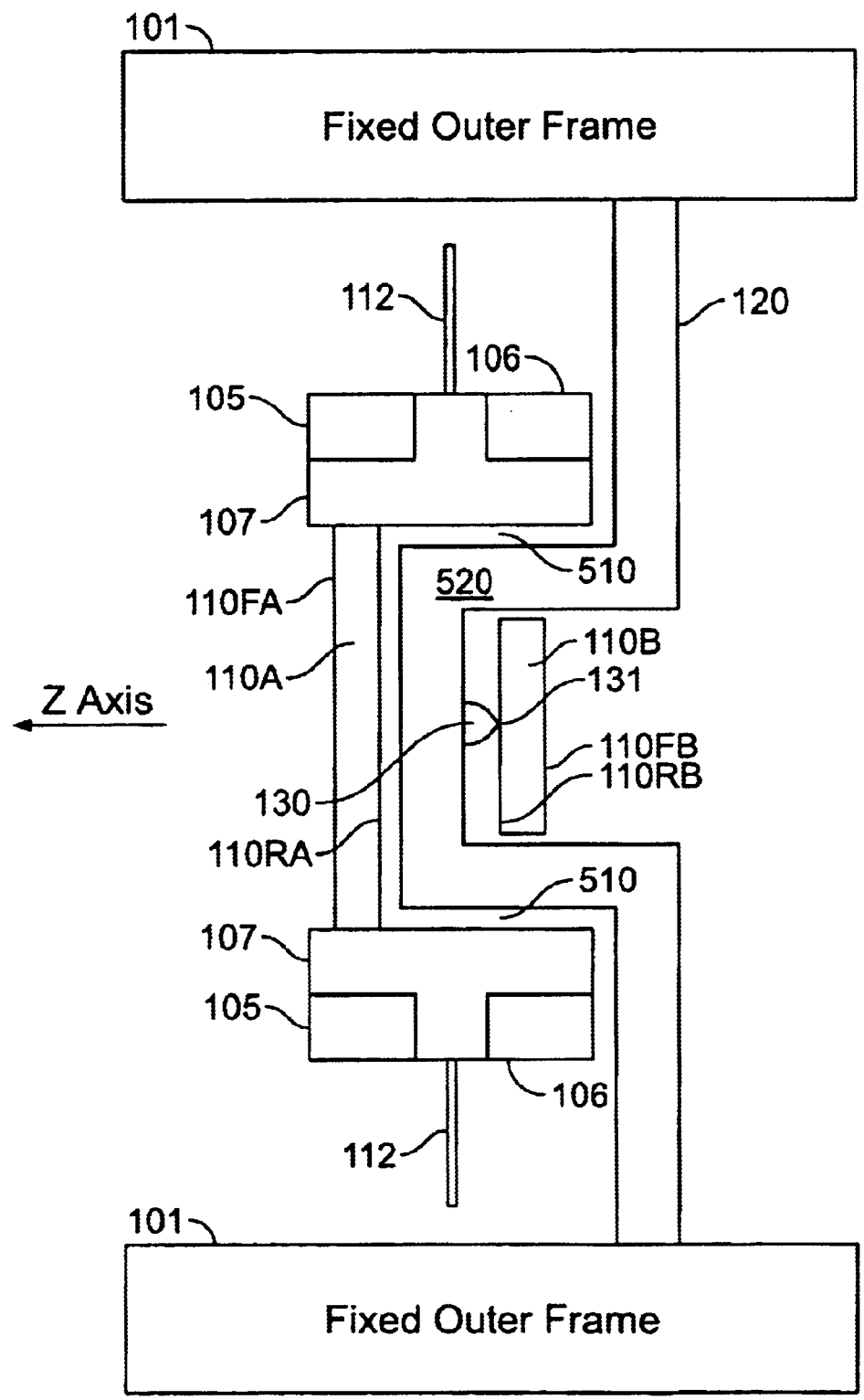

FIGS. 5A and 5B show details of a two-mirror design based on the Z-stop mechanism shown in FIG. 3. In FIG. 5A, the front mirror 110A is not shown in order to reveal the Z-stop mechanism. In this example, the pivot support bar 120 is engaged to the pivot support 130 to place the pivot point 131 on the back of the mirror 110B due to the design the mirror assembly. Notably, the rear mirror 110B is shaped to leave space 510 on both the top and bottom sides to accommodate for placing the pivot support bar 120. The pivot support bar 120 is bended to have a portion 520 located in the gap 310 to support the mirror 110B.

FIG. 5B shows the side view of the device of FIG. 5A along the line CC. The pivot support bar 120 has a portion that is bent or shaped to provide the pivoting without interfering with the rotation of the mirror assembly. The pivot support unit 130 is shown to place its tip 131 on the back of the mirror 110B because the mirror assembly is designed to have its center of rotation on or near the surface 110RB. Alternatively, the mirror assembly may be designed to have its center of rotation on or near the surface 110RA so that the pivot support unit 130 is fixed to the other side of the portion 520 to place its tip 131 on the surface 110RA. In yet another variation, the tip 131 may be placed on an extended portion of the inner frame 107 as suggested by FIG. 2B.

Hence, a mirror in the above actuator-controlled mirror is generally a part of a mirror assembly which also has other components fixed to the mirror. The Z-stop mechanism hence is used to provide a pivot point to contact and support the mirror assembly at or near the center of rotation of the mirror assembly. Preferably, the center of rotation and the center of mass of the mirror assembly are designed to approximately coincide with each other.

Figure 6A:
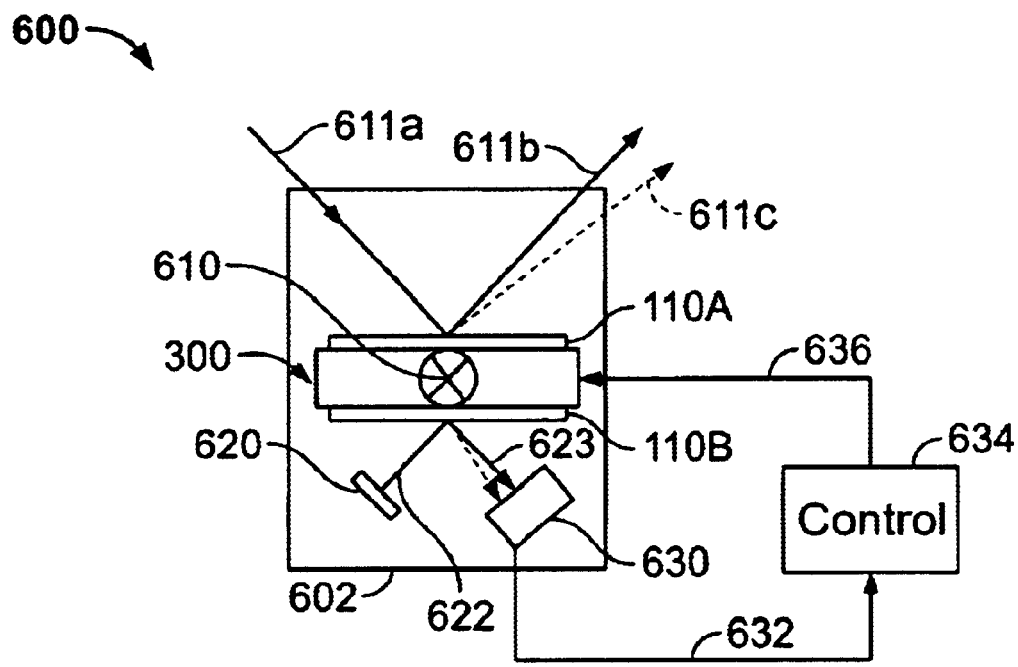
FIG. 6A shows an actively-controlled optical switch using the Z-stop mechanism shown in FIGS. 1 through 5B.

FIG. 6A shows one application of the two-sided actuator-controlled mirror 300 in an actively-controlled optical switch element 600. The actuator-controlled mirror 300 is shown to rotate around an axis 610 under the control of a driving current to the respective coil. The mirror 110A is used to receive a signal beam 611a and reflect it as a switched beam 611b whose direction is dictated by the rotation of the actuator-controlled mirror 300. The other mirror 110B is used to receive a servo optical beam 622 from a servo light source 620 and to reflect it as a reflected servo beam 623 to an optical detector 630 which determines the position of the actuator-controlled mirror 300. The servo optical beam 622 may have a servo wavelength different from that of the signal beam 611a so that the switch element 600 is a "dual-color" or dichroic optical device.

A base 602 is provided to support the actuator-controlled mirror 300, the servo light source 620 and the optical detector 630. In general, the actuator-controlled mirror 300 is operable to set two or more predetermined orientations for optical switching. When the mirror 110A directs the input signal beam 611a to a direction 611c that deviates from a desired predetermined direction 611b, the single or two coils in the actuator-controlled mirror 300 may be adjusted to correct the deviation and hence to adjust the reflected beam back to the proper direction 611b. Such operation is possible when the orientation of the mirror 110A can be monitored by measuring a direction change in a reflection of an optical servo beam 622 to detect the deviation.

The optical detector 630 may be a position-sensing photodetector to detect a position of the reflected servo beam 623. A LED or a diode laser may be used as the light source 620. The photodetector 630 may include a sensing surface operable to determine a position of the reflected monitor beam 623. For example, a detector with an array of discrete photosensing areas or pixels such as CCDs or quad detectors may be used. In addition, a semiconductor position sensitive detector with a PIN photodiode may be used. The PIN photodiode may include one or two uniform, resistive surfaces to provide continuous position data of a beam. The relative positions of the actuator-controlled mirror 300, the light source 620, and the detector 630 are arranged and calibrated so that the positions of the reflected servo beam 623 on the detector 630 can be used to measure the orientations of the actuator-controlled mirror 300. The output signal 632 of the detector 630 is fed to a control circuit unit 634 which processes the signal to extract the alignment error information. The control circuit unit 634 then generates a control signal 636 to control the orientation of the actuator-controlled mirror 300 by, e.g., changing the driving current to a respective coil, to reduce the alignment error. Therefore, the actuator-controlled 300, the detector 630, and the control circuit unit 634 collectively form a feedback control loop.

Figure 6B:
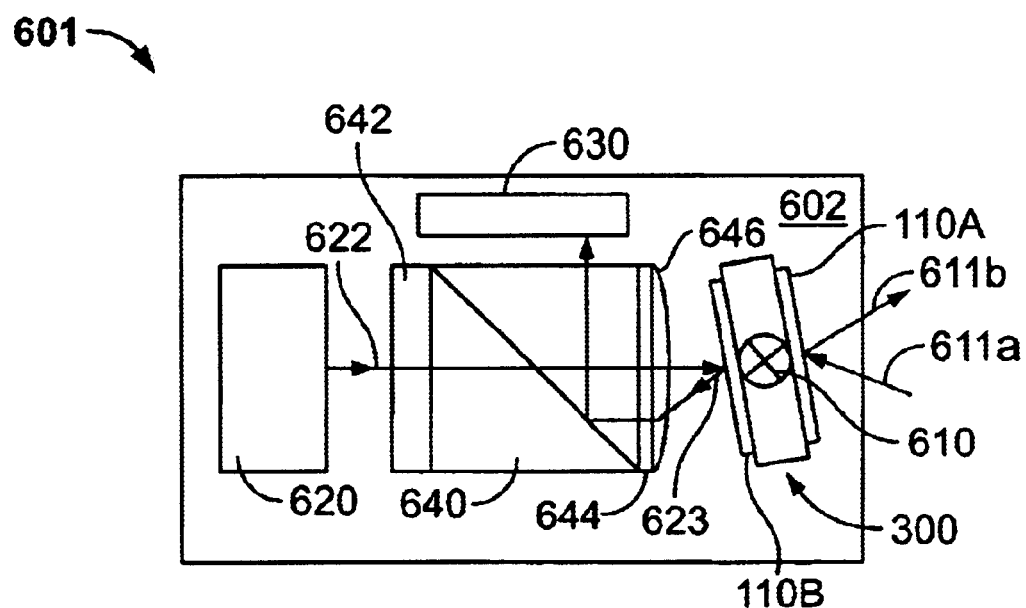
FIG. 6B shows another actively-controlled optical switch using the Z-stop mechanism shown in FIGS. 1 through 5B.

FIG. 6B shows a switch 601 with an alternative optical sensing mechanism. A polarization beam splitter (PBS) 640, a quarter wave plate 644 as a polarization rotator, and a lens 646 are used to guide the incident polarized servo beam 622 and the reflected servo beam 623. The servo beam 622 is linearly polarized upon entering the PBS 640 so that it transmits through the PBS 640. An optical element 642 may be placed between the light source 620 and the PBS 640 to modify the output beam from the light source 620 so that the beam is linearly polarized along a proper direction and is well collimated. The lens 646 then images the servo beam 622 onto the mirror 110B. The reflected servo beam 623 passes through the lens 646 and the polarization rotator 644 for the second time so that its polarization is rotated by 90 degrees with respect to the original polarization. The PBS 640 then directs the reflected servo beam 623 to the photodetector 630 by reflection.

The Z-stop mechanism in the switching elements in FIGS. 6A and 6B improves the pointing accuracy and provides operational consistency when the entire switching element is oriented differently in the gravitational field. The Z-stop mechanism can also make the actuator-controlled mirror relatively immune to the effects of shock and vibration. Without a Z-stop, the mirror assembly has a low frequency for the Z vibration mode, e.g., less than 100 Hz, that may be easily excited by external shock or vibration or by switching from one mirror position to another. The Z motion of the mirror thus may not be within the responsive range of the servo control loop and therefore beam positioning errors associated with the Z motion cannot be corrected by the servo system. With the Z-stop, the resonant frequency in the Z direction may be changed to approximately 1000 Hz and thus the Z displacement due to shock, vibration or switching becomes insignificant in inducing vibrations along the Z direction in comparison with the case without the Z-stop. In addition, one notable feature of the Z-stop mechanism is to reduce the torsional stiffness of the flexure spring or other support member so that the driving power for each galvanometer 300 is low (<20 mNmm/rad). This provides a power efficient switching array where multiple such galvanometer mirrors are used. The servo feedback mechanism makes each switching element intelligent and self-maintained.

Only a few embodiments are disclosed. However, it is understood that variations and enhancements may be made without departing from the spirit of and are intended to be encompassed by the following claims.

What is claimed is:

1. A device, comprising:
   a fixed frame;
   a mirror assembly having a coil and a mirror that are fixed relative to each other;
   a flexure spring engaging said mirror to said fixed frame to allow said mirror assembly to rotate around a rotational axis relative to said fixed frame under an action of a torque;
   a rigid support bar fixed to said fixed frame;
   a pivot support unit disposed between and in contact with said support bar and said mirror assembly to pivot said mirror assembly at or near a center of rotation of said mirror assembly with respect to said support bar; and
   a second mirror in said mirror assembly, fixed relative to said mirror, said second mirror having a reflective surface facing a direction opposite to a reflective surface of said mirror.

2. The device as in claim 1, wherein said flexure spring has a structure to engage said mirror assembly to further rotate around a second rotational axis in addition to said rotational axis, wherein said mirror assembly further includes a second coil fixed relative to said coil and said mirror, said coil and said second coil responsive to two independent control electric currents, respectively, to control rotation of said mirror assembly around said rotational axis and said second rotational axis, respectively, in presence of magnetic fields at said coils.

3. The device as in claim 1, further comprising:
   a monitor light source to produce a monitor beam incident to said second mirror;
   a monitor detector disposed relative said second mirror to receive a reflection of said monitor beam off said second mirror to determine a direction of said second mirror; and
   a control unit coupled to receive a detector signal from said monitor detector to control a driving electric current according to said direction of said second mirror to control direction of said mirror.

4. The device as in claim 3, wherein said monitor detector is a position-sensitive detector.

5. The device as in claim 1, wherein said pivot support includes an elastic material.

6. The device as in claim 5, wherein said elastic material includes a silicon gel.

7. The device as in claim 5, wherein said elastic material includes an elastomer.

8. A device, comprising:
   a fixed frame;
   a mirror assembly having a coil and a mirror that are fixed relative to each other;
   a flexure spring engaging said mirror to said fixed frame to allow said mirror assembly to rotate around a rotational axis relative to said fixed frame under an action of a torque;
   a rigid support bar fixed to said fixed frame; and
   a pivot support unit disposed between and in contact with said support bar and said mirror assembly to pivot said mirror assembly at or near a center of rotation of said mirror assembly with respect to said support bar,
   wherein said flexure spring has a stiffness less than about 20 mNmm/rad.

9. The device as in claim 8, further comprising a second mirror in said mirror assembly, fixed relative to said mirror, said second mirror having a reflective surface facing a direction opposite to a reflective surface of said mirror.

10. The device as in claim 9, further comprising:
    a monitor light source to produce a monitor beam incident to said second mirror;
    a monitor detector disposed relative said second mirror to receive a reflection of said monitor beam off said second mirror to determine a direction of said second mirror; and
    a control unit coupled to receive a detector signal from said monitor detector to control a driving electric current according to said direction of said second mirror to control direction of said mirror.

* * * * *